United States Patent [19]

Nilsson

[11] 3,795,836
[45] Mar. 5, 1974

[54] INTENSITY LIMITING MEANS FOR CATHODE RAY OSCILLOSCOPE

[75] Inventor: Ake Valentin Nilsson, Karlskoga, Sweden

[73] Assignee: Aktiebolaget Bofors, Bofors, Sweden

[22] Filed: Feb. 29, 1972

[21] Appl. No.: 230,258

[30] Foreign Application Priority Data
Mar. 1, 1971 Sweden............................ 2538/71

[52] U.S. Cl.................. 315/30, 178/6.7 R, 346/110
[51] Int. Cl............................................ H01j 31/10
[58] Field of Search... 346/110; 178/DIG. 16, 6.7 R, 178/6.7 A; 315/30; 355/20, 81

[56] References Cited
UNITED STATES PATENTS

| | | | |
|---|---|---|---|
| 2,343,988 | 3/1944 | Mahoney | 315/30 |
| 2,414,228 | 1/1947 | Gottier | 315/30 |
| 2,997,620 | 8/1961 | Katzmann | 315/30 X |
| 3,465,200 | 9/1969 | Higbee et al. | 315/30 |
| 3,633,044 | 1/1972 | Buckstad | 178/DIG. 16 X |

OTHER PUBLICATIONS

Beetle; D. H.; Cathode Ray Tube Phosphor Protection Circuit; IBM Technical Disclosure Bulletin, Vol. 7, No. 9, Feb. 1965, pp. 839–840.

Primary Examiner—Joseph W. Hartary
Attorney, Agent, or Firm—George Vande Sande

[57] ABSTRACT

Display apparatus including a cathode ray oscilloscope is provided, primarily but not exclusively for thermography, to obtain photographic records of the oscilloscope image without danger of overexposing the photosensitive film. The apparatus includes means to limit the intensity of the oscilloscope image which means is presettable to modify the image signal (i.e., the signal normally determining intensity) only when its amplitude exceeds a predetermined value, whereby the image intensity is prevented from exceeding a desired maximum corresponding to the characteristics of the film and a given exposure time and aperture. Circuits are described for suppressing the electron beam when its intensity would otherwise exceed the desired maximum.

3 Claims, 4 Drawing Figures

INTENSITY LIMITING MEANS FOR CATHODE RAY OSCILLOSCOPE

BACKGROUND OF THE INVENTION

The present invention relates to display apparatus including a cathode ray oscilloscope.

The invention is primarily concerned with apparatus for use with a light sensitive film for recording the image displayed on the screen of the unit. This film is arranged in a camera, the exposure time of which is selected dependent on the image-frequency of the display unit. The aperture of the camera is chosen dependent on the sensitivity of the film as used and the selected exposure time. The display apparatus may comprise manually adjustable means for controlling the amplitude of the electrical signal (herein called the image signal) which is supplied to intensity modulating means in the oscilloscope for producing the image on the screen thereof.

A main object of the invention is to provide means to ensure correct exposure of the film, which amounts primarily to avoiding over-exposure.

Though the present invention is applicable to most types of image producing systems, e.g., TV-systems, it has proved especially valuable in so-called thermographical equipments and therefore, it will henceforth be treated entirely in connection with such equipment.

A thermographic equipment consists chiefly of a camera unit and a display unit. The camera unit scans an object mechanically, e.g., with rotating mirrors. The heat radiation from the object is thus concentrated on a detector sensitive to heat radiation, which generates an electrical signal, the so-called image signal, the amplitude of which is dependent on the intensity of the received radiation. This image signal is supplied to the display unit, most often a common cathode ray oscilloscope, on the screen of which now appears a grey-toned image, thus representing a so-called temperature image of the object being scanned.

For most uses of the equipment, for example in medical diagnosis, the observer has neither time nor possibility to study and analyse the information about the temperature distribution of the scanned object represented by the oscilloscope image. The information received in this image must of necessity be stored to enable a specialist's examination at some future time. The image is best stored as a photographic record.

To make such documentation completely reliable, it is, however, extremely important to expose the film correctly, which means that the intensity of the oscilloscope image must be adapted to the sensitivity to light of the film used in the camera as well as to chosen exposure time and aperture of the camera.

Under no circumstances whatsoever must the intensity of the image be so high as to exceed the exposure range of the film or in other words the film must not be overexposed.

Given that the above mentioned conditions concerning exposure range must prevail, an exceedingly experienced operator is required to adjust the intensity of the image so that a correct exposure of the film in question is obtained. Often the task is made more difficult by requiring a fast adjustment: e.g., in military use, when the scanned object is present only for a short period of time.

Usually the above measurements are effected by those who, though certainly experts on the actual application within which the thermographical equipment is being used, are mere laymen so far as concerns the technology of the display apparatus itself.

Besides, there are occasions when it might be difficult even for an experienced operator to make a fast as well as a correct adjustment of the intensity of the oscilloscope image. For example, this is often the case when the operator is required to measure on an object that he has not earlier scanned. The difficulties turn out to be especially great in those cases when both the object and the background have a "flat" temperature distribution.

The general purpose of the present invention is, therefore, primarily to present a device which so far as possible eliminates the need of subjective decision on how to adjust the intensity of the oscilloscope image to be photographed, in order to expose the film correctly. By doing so, it will be exceedingly easy even for a layman to make a fast and correct adjustment.

SUMMARY OF THE INVENTION

The present invention provides display apparatus which is primarily characterised by means to which the image signal is supplied, which means are arranged and pre-set to block or at least to influence the image signal during those intervals of time when its amplitude exceeds a predetermined value which, at a given setting of exposure time and aperture in the camera and a given sensitivity of the film would in the absence of such means have caused such an intensity in the sections or points of the image corresponding to said intervals of time, and consequently such an exposure of the film, that its maximum range of exposure would have been exceeded. This results in that the intensity-modulating means or other means influencing the electron beam of the oscilloscope are supplied with such a voltage during said intervals of time that said sections or points are almost or completely extinguished in the image. It is then possible, maintaining the above-mentioned setting of the exposure time and the aperture of the camera, to adjust the amplitude of the image signal by means of the previously mentioned manually adjustable means until the most light intensive section or point within that part of the image which requires to be studied, is just about to be extinguished.

It will be appreciated that the invention has both apparatus and method aspects.

In the following, two embodiments of the invention are described.

DESCRIPTION OF THE PREFERRED EMBODIMENTS

Figure 1:
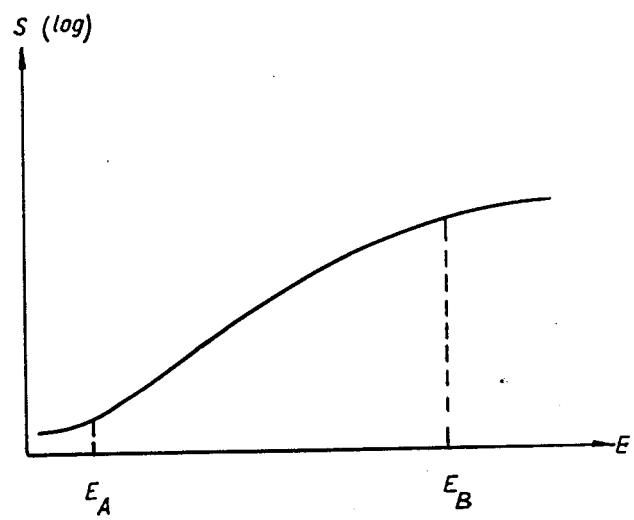
FIG. 1 shows the general appearance of a density curve for a film, i.e., the graphical relation between the illumination E of the film and the density S of the same.

Referring now to FIG. 1, $E_A$ and $E_B$ indicate the limit values for the illumination on the photosensitive film, and it is necessary to keep within these values to achieve a correct exposure of the film in question. This part of the density curve is on the whole logarithmic linear for most types of films. If the illumination exceeds the limit value $E_B$ of the figure, the film will be over-exposed. This means that the intensity of the oscilloscope image to be photographed must be below a value corresponding to the illumination $E_B$.

Figure 2:
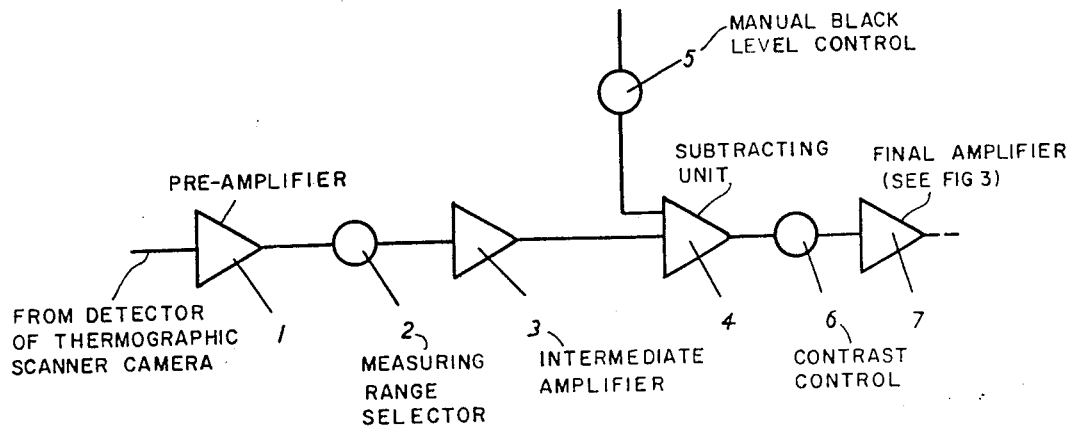
FIG. 2 in block diagram shows the image-signal processing circuits in a conventional thermographical equipment.

The FIG. 2 block diagram illustrates the processing of an electrical signal, called herein the image signal, which is generated by the detector (not shown) of a camera unit when scanning an object; it is supplied to an intensity-controlling grid of a display unit (also not shown) for displaying the temperature distribution of the object being scanned. A pre-amplifier 1 is supplied with the signal from said detector. The output of pre-amplifier 1 is connected to a measuring range selector 2, by which a measuring range can be roughly adjusted, appropriate for the variations in temperature of the object being scanned. The input of an intermediate amplifier 3 is connected to the measuring range selector 2, and its output to one of the inputs of a subtracting unit 4, the other input of which is connected to a so-called black level control 5. This control in its turn supplies the subtracting unit 4 with a voltage, the amplitude of which is manually fixed by the control 5. By these means, the image signal can be manually adjusted to increase or reduce its amplitude, so as in effect to raise or reduce the average light-value of the image being displayed by the control 5. A so-called contrast control 6 is connected to the output of the subtracting unit 4 by which the amplification of the image signal, i.e., the contrast of the image, can be manually adjusted. Therefore, when measuring, the intensity of the image being displayed can also be adjusted by the control 6. As a rule the intensity can be varied also by a control "Intensity", which is found on all common types of oscilloscopes. In a thermographical equipment, however, this control is only adjusted for trimming, if at all, and normally it should be left untouched throughout a measurement. After the contrast control 6, the image signal is supplied to a final amplifier stage 7, the output of which is connected to the above-mentioned intensity-controlling grid in the picture tube of the display unit.

Figure 3:
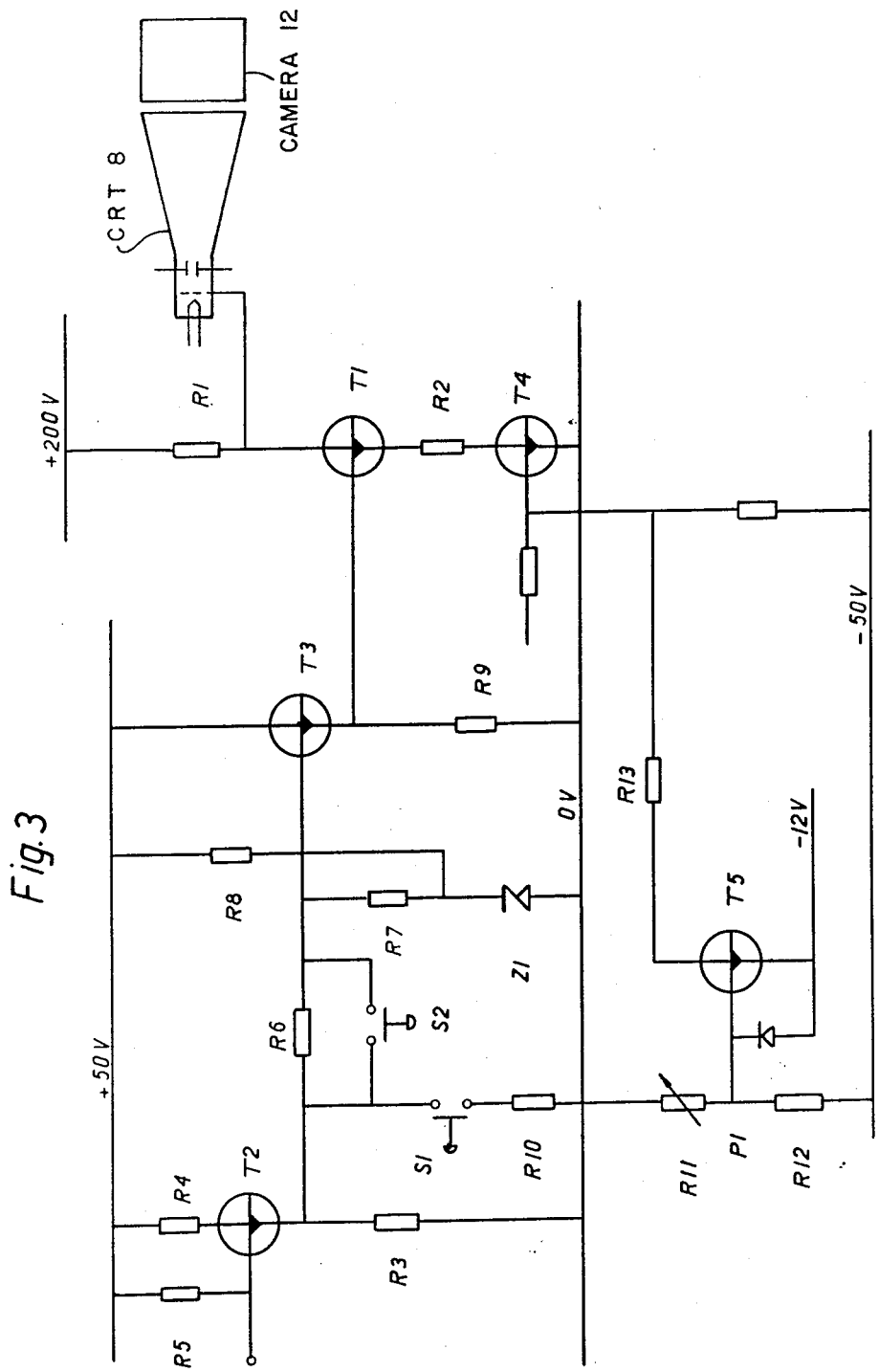
FIG. 3 illustrates an embodiment of the invention and shows an electrical circuit to be arranged in the signal-processing circuits according to FIG. 2.

In accordance with the present invention, the circuit according to FIG. 3 is arranged between the contrast Control 6 according to FIG. 2 and the intensity-controlling grid of the display unit. The final amplifier stage 7 of FIG. 2 is included in FIG. 3 circuit in the form of a transistor amplifier comprising the transistor T1 and the resistors R1, R2. From the FIG. 2 contrast control 6, the image signal is supplied to the base of a transistor T2, which together with an emitter-resistor R3 and protective resistors R4 and R5 constitute an emitter-follower. The emitter of the transistor T2 is connected to two switches S1 and S2. When the switch S1 is turned on, the intended result of the present invention is obtained. An arrangement according to the present invention need not necessarily contain the switch S2 and certain other components described below. When the switches S1 and S2 are open the image signal voltage is divided by two resistors R6,R7. With the switch S1 still open, if switch S2 is closed, the resistor R6 is short-circuited and thus no longer affects the image signal amplitude through voltage-division. The switch S2 enables the same intensity to be obtained for a picture presented in normal size as for the same picture enlarged. In the latter case, the electronic beam of the oscilloscope sweeps at a higher speed and the sweep like separation is greater than that of a normal size picture. A zener diode Z1 between the resistor R7 and ground constitutes a reference on the voltage-division of the image signal, which receives its bias voltage via the resistor R8. After voltage division, the image signal at first passes another emitter-follower in the form of a transistor T3 and a resistor R9, which serves as a protection for the final amplifier stage T1, R1 and R2. The amplified image signal is finally supplied to the intensity-controlling grid of the picture tube of the CRT oscilloscope included in the display unit.

The photographic camera 12 may be so disposed relative to the oscilloscope 8 as to permit photographing the image appearing on its screen.

A transistor T4 of the emitter circuit of the amplifying transistor T1 works as a switch, which is closed when the electron beam is to be seen, and broken, when the beam is to be extinguished on every $x$-sweep return and every $y$-sweep return.

Normally (when the switch S1 is open) the transistor T4 is controlled by an AND circuit, (not shown in the FIG.). The transistor T4 will now be cut off on the above mentioned sweep returns. This means that the transistor T1 is also cut off, the collector of the transistor T1 will then have a potential of almost +200 V. When the transistor T4 is conducting and a normal image signal is present, the potential of the collector of the transistor T1 varies approximately between +110 V (black on the screen) and +60V (white on the screen).

When the switch S1 is closed the image signal is supplied to the base of a transistor T5 via a voltage-divider made up by three resistors R10, R11 and R12. When the voltage-divided image signal on the base of transistor T5 exceeds the turn-on-level of the transistor T5 ($\approx -11.5V$), this transistor becomes highly conducting, which means that current passes through a resistor R13 in the collector circuit of the transistor T5. The base of the transistor T4 thus comes below ground potential, and the transistor T4 is cut-off, which in turn also causes the transistor T1 to stop conducting. As a result the image signal is blocked and the intensity controlling grid of the picture tube receives a potential almost equal to +200V. In this way, the sections or points of the picture which correspond to those parts of the image signal which, at the base of the transistor T5 have a potential exceeding about −11.5V, will extinguish. The resistor R11 is a trimming potentiometer and can be set to select a desired white level at which the picture is to be extinguished. This white level is chosen to correspond to an illumination of the film which is below the value $E_B$ of FIG. 1 for a given adjustment of exposure time and aperture of a camera placed in front of the oscilloscope and used to photograph the image displayed on the oscilloscope screen. Through this procedure, an over-exposure of the film is avoided. The actual exposure time is dependent on the frequency of the image being displayed, whereas the choice of aperture is chiefly dependent on the sensitivity of the film and exposure time in question.

The trimming of the potentiometer R11 is preferably made as follows. A piece of cotton-wool is placed before the movable mirror in the camera unit of the thermography equipment, which is used for horizontal scanning. This results in that the detector receives a constant signal. An exposure meter is adjusted on the value due to correspond to the maximum range of exposure for a film with normal sensitivity to light for a certain adjustment of the exposure time and the aperture of the actual camera. The light in the measuring room is switched off, the exposure meter is kept nearby and at right angles to the picture screen. The intensity of the image is adjusted by the black level control 5 according to FIG. 2 to the value set on the exposure meter. The switch S1 according to FIG. 3 is closed, whereafter the resistance of the potentiometer R11 is adjusted until the oscilloscope image starts extinguishing.

When changing from a film with one particular sensitivity to light to a film with another sensitivity, there is no need to correct the adjustment of the potentiometer; instead the operator only adjusts the aperture of the camera.

Figure 4:
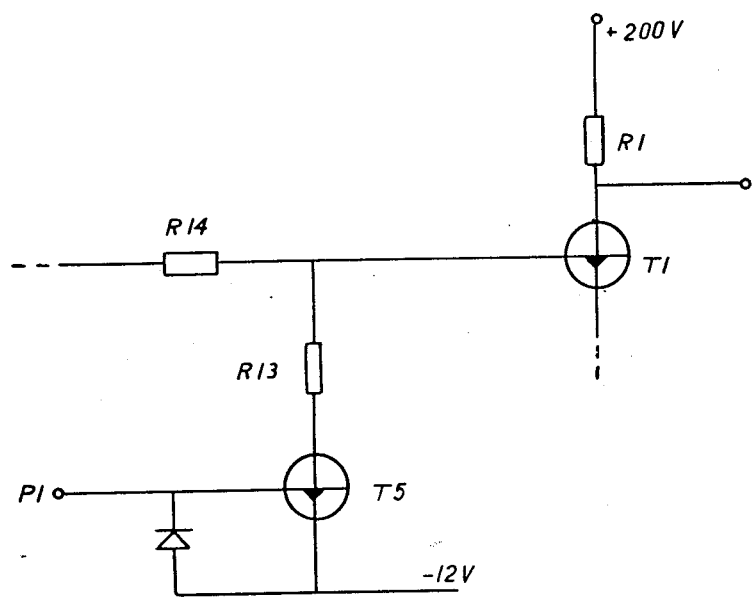
FIG. 4 is a circuit diagram, which together with certain parts of the circuit according to FIG. 3 illustrates another embodiment of the invention.

In FIG. 4 the base of the transistor T5 according to FIG. 3 is still again to the output P1 off the voltage-divider R10, R11 and R12. However, instead of being connected to the base of the so-called extinguish-transistor T4 in FIG. 3 (also included in a conventional display unit), the resistor R13 of the collector circuit of the transistor T5 is here connected to the normal image signal channel, that is, it is connected via a resistor R14 to the emitter of the emitter-follower T3 in FIG. 3 and by that also to the base of the final amplifier stage T1 in FIG. 3. This means that when the transistor T5 is conducting i.e., when the divided image signal at the base of the transistor T5 exceeds its turn-off-level, the potential at the base of the transistor T1 will drop so considerably that the intensity controlling grid of the oscilloscope is supplied with a voltage greater than +110V. As a result, those sections or points of the image, which otherwise would have had an intensity exceeding the maximum desired white level are completely extinguished.

The present invention is of special advantage when pictures taken at certain intervals in time are compared to discover if any changes have arisen in the temperature distribution of a scanned object. For this purpose, a reference body represented by a so-called black body is placed in the viewing angle of the camera together with the object to be scanned. The reference body must have a higher temperature than the object in question. Switch S1 being opened, a normal grey-tone-image is set by using the adjustment of the range selector 2 according to FIG. 2 which best corresponds to the actual image range. Switch S1 being closed, the controls indicated by 5 and 6 in FIG. 2, are set such that that section or point of the image which represents the reference body is extinguished. The operator then knows for certain that he has set an intensity of the image as high as that of an earlier occasion. Thus every change in the density of the exposed film corresponds to a real change in the temperature distribution of the scanned object, provided that the same sort of film has been used and that the same exposure time and aperture are used in the camera on both occasions.

As an example of further applications of the invention, the following could be mentioned. Often the temperature image of only a certain part of the scanned object is of special interest. If this part has a temperature, compared to the remaining parts of the object, such that it is represented by grey on the screen, then it is extraordinarily difficult to produce a photograph for later anlaysis using conventional equipment. The intensity of the image cannot be increased with a view to giving the grey section a higher intensity for a better exposure, as the intensity of the image is increased all over, whereby the former white parts of the picture would turn even "whiter" and thus cause over-exposure of the film. However, by means of the invention, this problem can be solved in an extremely elegant way. It is possible to increase the intensity of the image without causing an over-exposure of the film by closing the switch S1 and increasing the intensity of the particular image section of interest to a desired level, e.g., by the control 5. Those sections, which are of no interest and which in an equipment without the device according to the invention, would have turned even "whiter," will now be completely extinguished.

The invention is not limited to the embodiments described as above. Modifications are contemplated within the scope of the following claims. As an example of such modifications, the image extinction function as above described can be made to influence indirectly the image presented on the screen by supplying the image extinction signal to the cathode of the picture tube and thus cutting-off the electronic beam whereby those parts of the image that exceed the selected intensity level are completely extinguished. For this, the collector of the transistor T5 in FIGS. 3 and 4 is connected on the one hand via a resistor to a certain first potential, and on the other hand direct to said cathode. The emitter of the transistor is connected to a potential considerably lower than said first potential while its base is supplied with the image signal divided as above described.

I claim:

1. In display apparatus for a cathode ray oscilloscope of the type having a screen, electron beam controlling means for producing an image on the screen, and intensity modulating means responsive to an electrical image signal to control the intensity of the image on said screen, the improvement comprising:
    intensity limiting means presettable to modify the image signal only when its amplitude exceeds a predetermined value and including;
        a variable voltage divider to which said image signal is applied,
        a transistor whose base is connected to the tap on said voltage divider,
        said transistor conducting when said image signal exceeds said predetermined value and being then effective to render said intensity modulating means ineffective,
    said intensity limiting means further including second and third transistors,
    the collector of said first transistor being connected by a first resistor to the base of the second transistor, the emitter of said second transistor being connected to a first fixed potential source,
    the collector of said second transistor being connected via a second resistor to the emitter of said third transistor, the base of said third transistor being supplied with said image signal, and the collector of said third transistor being connected on the one hand to said intensity modulating means, and on the other hand via a third resistor to a second fixed potential source for extinguishing the beam of the oscilloscope.

2. In display apparatus for a cathode ray oscilloscope of the type having a screen, electron beam controlling means for producing an image on the screen, and intensity modulating means responsive to an electrical image signal to control the intensity of the image on said screen, the improvement comprising:

intensity limiting means presettable to modify the image signal only when its amplitude exceeds a predetermined value and including a variable voltage divider to which said image signal is applied, said intensity limiting means including;

a transistor whose base is connected to the tap on said voltage divider, said transistor conducting when said image signal exceeds said predetermined value and being then effective to render said intensity modulating means ineffective, and a further transistor having its base supplied with said image signal and its collector connected to said intensity modulating means, the collector of said first transistor being connected via a resistor to the image signal channel at the base of said further transistor.

3. In display apparatus for a cathode ray oscilloscope of the type having a screen, electron beam controlling means for producing an image on the screen, and intensity modulating means responsive to an electrical image signal to control the intensity of the image on said screen, the improvement comprising:

intensity limiting means presettable to modify the image signal only when tis amplitude exceeds a predetermined value and including;

a variable voltage divider to which said image signal is applied, a transistor whose base is connected to the tap on said voltage divider, said transistor conducting when said image signal exceeds said predetermined value, a further transistor having its base supplied with the image signal and its collector connected to the intensity modulating means, said first transistor being connected via a resistor to the base of said further transistor, the collector of said further transistor being connected via a resistor to a higher potential than that of the emitter of said further transistor and being connected also to the intensity modulating means of the oscilloscope.

* * * * *